3,402,041
PROCESS FOR REMOVING PHOSPHORUS
FROM IRON ORES
Ignatz L. Feld, Tuscaloosa, Ala., and Thomas W. Franklin and William M. Lampkin, New Orleans, La., assignors to the United States of America as represented by the Secretary of the Interior
No Drawing. Filed May 6, 1966, Ser. No. 548,823
11 Claims. (Cl. 75—7)

ABSTRACT OF THE DISCLOSURE

High phosphorus iron ore is roasted in the presence of alkaline earth metal halides, particularly calcium chloride, or halides of ammonia, manganese, zirconium, copper or lithium. After cooling, the ore is leached with acid to remove phosphorus.

---

This invention relates to the removal of phosphorus from iron oxide-bearing materials such as iron ores and iron ore concentrates.

There is a continuing and increasing need to produce pig iron with low phosphorus content inasmuch as certain steels and some foundry irons such as ductile cast iron require low phosphorus pig iron for their manufacture. In the commercial production of pig iron by blast furnace smelting, the iron ores fed to the furnace comprise the major source of iron-bearing raw material. No control of phosphorus in the pig iron product is achieved in the smelting process and generally all of the phosphorus present in the ore is reduced and alloyed in the pig iron. Hence, any need to control the maximum phosphorus content of blast furnace pig iron must be made by using iron ore furnace feeds that will not contain more than a specified amount of phosphorus. Although the simplest method for producing low phosphorus pig iron would be to smelt low phosphorus iron ores in the blast furnace, the limited supply of these ores severely restricts this practice. Therefore, a need has existed to develop a method of treating available ores to reduce their phosphorus content to an acceptable value. Such a method would make phosphorus-containing iron ores such as limonitic iron ores more widely usable thereby increasing the value and prolonging the useful life of deposits of these ores.

The object of this invention is to treat iron oxide-bearing materials containing phosphorus such as iron ores and iron ore concentrates to remove phosphorus therefrom.

The invention is based on the discovery that roasting these materials under certain conditions in the presence of certain additives enables the phosphorus to be subsequently leached therefrom.

For a more detailed understanding of the invention and for further objects and advantages thereof, reference is to be had to the flow diagram below.

Generally, an iron oxide-bearing material such as iron ore or iron ore concentrate (e.g., a beneficiated iron ore which contains high iron content) is mixed with a quantity of a particular roasting additive, the mixture then being transferred to a roasting furnace wherein it is roasted with free access of air. Phosphorus-containing components in the raw material are converted to a soluble form (with respect to later acid treatment) by these steps. After cooling the roasted mass, it is transferred to a leaching vessel and mixed with a leaching agent for extracting the phosphoric components. After leaching, the slurry of insoluble material and pregnant solution is filtered and the dephosphorized iron ore residue washed free of soluble salts with water.

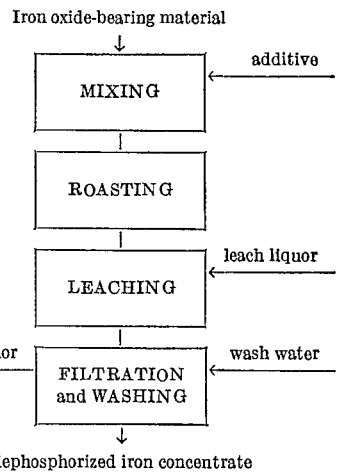

As to the roasting additive employed, the following compounds resulted in the extraction of very high percentages of the phosphorus: alkaline earth metal halides, particularly calcium chloride; halides of ammonia, manganese, zirconium, copper, and lithium. Compounds containing bromine, fluorine or chlorine as the halogen are the most effective. Substantial dephosphorization is achieved by the presence of about 5% to about 15% by weight of the additive in the mixture. Maximum efficiency is accomplished with the addition of about 10% by weight with most of the additives.

In the roasting step a roasting temperature ranging from 500° C. to 1200° C. yields a desirable and product. About 900° C. achieves maximum results with most additives. Roasting time is dependent upon the quantity of the charge, the size of the furnace and other factors which would determine the rate at which the entire charge reached the desired operating temperature. After the charge is brought up to a predetermined operating temperature, a further heating time of at least about 30 minutes is necessary for substantial dephosphorizing.

As to the leaching step, inorganic acids such as sulfuric acid, hydrochloric acid and nitric acid are effective agents for the process of the present invention. Liquors containing these acids, such as spent pickle liquor from a steel mill, are also suitable. Varying amount of acid ranging from 40 to 320 pounds per ton of iron oxide-bearing material may be employed, the amount of acid required for maximum extraction depending upon the individual acid employed and the strength of that acid. Acid solution concentrations ranging from about 3.9 to 5.2 percent by weight are desirable. A leaching temperature of about 30° C. achieves maximum results for most acids. Leaching times ranging from 5 to 30 minutes are suitable for the purposes of the invention. As in the case of most leaching operations, the particle size of the charge directly affects leaching time, and one may vary the particle size by, for example, crushing and screening.

The following table shows the effects of treating an ore sample containing 47.7% iron and 0.421% phosphorus with the process of this invention.

TABLE—RESULTS OBTAINED BY PRACTICING THE INVENTION WITH CHLORIDES AS ROASTING ADDITIVES

| Additive reagent | Leaching acid | Weight, percent of roasted mixture | Leached Residue | | | | | |
|---|---|---|---|---|---|---|---|---|
| | | | Chemical analysis, percent | | Extraction, percent | | Recovery, percent | |
| | | | P | Fe | P | Fe | P | Fe |
| LiCl | H₂SO₄ | 85.1 | .018 | 55.5 | 96.4 | 1.0 | 3.6 | 99.0 |
| CsCl | H₂SO₄ | 88.8 | .081 | 52.5 | 82.9 | 2.3 | 17.1 | 97.7 |
| MgCl₂ | H₂SO₄ | 85.0 | .066 | 50.3 | 86.7 | 10.4 | 13.3 | 89.6 |
| MgCl₂ | HCl | 84.6 | .082 | 54.9 | 83.5 | 2.6 | 16.5 | 97.4 |
| CaCl₂ | H₂SO₄ | 88.8 | .040 | 52.9 | 91.6 | 1.5 | 8.4 | 98.5 |
| CaCl₂ | HCl | 82.4 | .037 | 56.8 | 92.8 | 8.1 | 7.2 | 98.1 |
| CaCl₂ | HNO₃ | 83.6 | .017 | 56.2 | 96.6 | 1.5 | 3.4 | 98.5 |
| SrCl₂ | H₂SO₄ | 90.4 | .037 | 52.2 | 92.1 | 1.1 | 7.9 | 98.9 |
| BaCl₂ | H₂SO₄ | 83.1 | .064 | 50.9 | 87.4 | 11.3 | 12.6 | 88.7 |
| BaCl₂ | HCl | 83.4 | .072 | 54.9 | 85.7 | 4.0 | 14.3 | 96.0 |
| MnCl₂ | H₂SO₄ | 89.5 | .023 | 52.6 | 95.1 | 1.3 | 4.9 | 98.7 |
| CuCl₂ | H₂SO₄ | 86.8 | .003 | 55.3 | 87.0 | | 13.0 | 100 |
| ZrCl₄ | H₂SO₄ | 92.3 | .064 | 51.0 | 86.0 | 1.3 | 14.0 | 98.7 |
| NH₄Cl | H₂SO₄ | 82.7 | .081 | 56.4 | 84.1 | 2.2 | 15.9 | 97.8 |
| SnCl₄ | H₂SO₄ | 90.5 | .088 | 52.2 | 81.1 | 1.0 | 18.9 | 99.0 |
| NbCl₅ | H₂SO₄ | 89.6 | .116 | 52.2 | 75.3 | 1.9 | 24.7 | 98.1 |
| CrCl₃ | H₂SO₄ | 90.8 | .130 | 48.3 | 72.0 | 8.1 | 28.0 | 91.9 |
| NaCl | H₂SO₄ | 85.6 | .163 | 54.7 | 66.9 | 1.8 | 33.1 | 98.2 |
| NaCl | HCl | 84.9 | .100 | 55.5 | 79.8 | 1.2 | 20.2 | 98.8 |
| KCl | H₂SO₄ | 83.9 | .115 | 56.5 | 77.1 | .6 | 22.9 | 99.4 |

Test Conditions:
Roasted mixture: 90 percent ore, 10 percent additive reagent.
Roasted temperature: 900° C.
Roasting time at temperature: 2 hours.
Quantity of acid used for leaching: 160 pounds of acid per ton of ore.
Leaching time: 30 minutes.
Leaching temperature: 30° C.

Comparison of the roasting additives in the table shows that the alkaline earth metal halides are measuredly superior as phosphorus solubilizing agents to the alkali metal halides, with the exception of lithium chloride. Likewise, halides of manganese, copper, zirconium and ammonia accomplished very high phosphorus reduction. From a standpoint of practicality, economy and effectiveness, CaCl₂ is the most suitable for the process, since it is readily available, easy to use and relatively inexpensive.

The process may be carried out in a batch or continuous manner. Conventional equipment and operating procedures may be used in either case. If a continuous process is employed, a multiple stage extraction procedure can be efficiently used whereby pregnant liquor is recycled through further leaching stages so that maximum utilization of the leaching reagent can be obtained.

A high phosphorus extraction is combined with high iron recovery in the process of the present invention. Practice of the invention would reduce the phosphorus content of iron ores and concentrates and increase the iron grade of the dephosphorized product thereby making these ores and concentrates more valuable and usable in iron production. Practice of the invention would be a means for conserving the iron ore resources throughout the world.

While the particular process herein described is well adapted to carry out the objects of the present invention, it is to be understood that various modifications and changes may be made all coming within the scope of the following claims.

What is claimed is:

1. A method for dephosphorizing iron oxide-bearing material containing phosphorus comprising
   (a) mixing with the material an additive selected from the group consisting of alkaline earth metal halides, halides of ammonia, manganese, zirconium, and copper, the additives being present in an amount ranging from 5% to about 15% by weight of the total mixture;
   (b) heating said mixture to an elevated temperature between 500° C. and 1200° C, maintaining said mixture at said elevated temperature for at least about 30 minutes to roast the mix;
   (c) cooling the mixture;
   (d) leaching the cooled mixture with an inorganic acid, and separating the resultant pregnant phosphorus-containing leach liquor and iron-containing residue from one another.

2. The method of claim 1 wherein said iron oxide-bearing material is selected from the group consisting of iron ore and iron ore concentrates.

3. The method of claim 2 wherein the inorganic acid is selected from the group consisting of hydrochloric acid, sulfuric acid and nitric acid.

4. The method of claim 3 wherein the roasting step is carried out at about 900° C.

5. The method of claim 1 wherein the roasting step is carried out at about 900° C.

6. The method of claim 1 wherein the additive is calcium chloride.

7. The method of claim 3 wherein the additive is calcium chloride.

8. The method of claim 4 wherein the additive is calcium chloride.

9. The method of claim 1 wherein the additive is manganese chloride.

10. The method of claim 1 wherein the additive is selected from the group consisting of magnesium chloride, strontium chloride and barium chloride.

11. The method of claim 1 wherein the halogen component of said additive is selected from group consisting of bromine, chlorine and fluorine.

References Cited

UNITED STATES PATENTS 542,171 7/1895 Phillips _____ 75—6
3,232,744 2/1966 Munekata et al. _____ 75—7

FOREIGN PATENTS 448,505 5/1948 Canada.
1,924 1875 Great Britain.
327 1868 Great Britain.

OTHER REFERENCES

L. A. Roe, "Iron Ore Beneficiation," pp. 216–219; Lake Bluff, Ill., Minerals Publishing Co., 1957.

L. DEWAYNE RUTLEDGE, *Primary Examiner.*

E. L. WEISE, *Assistant Examiner.*